United States Patent Office 3,242,070
Patented Mar. 22, 1966

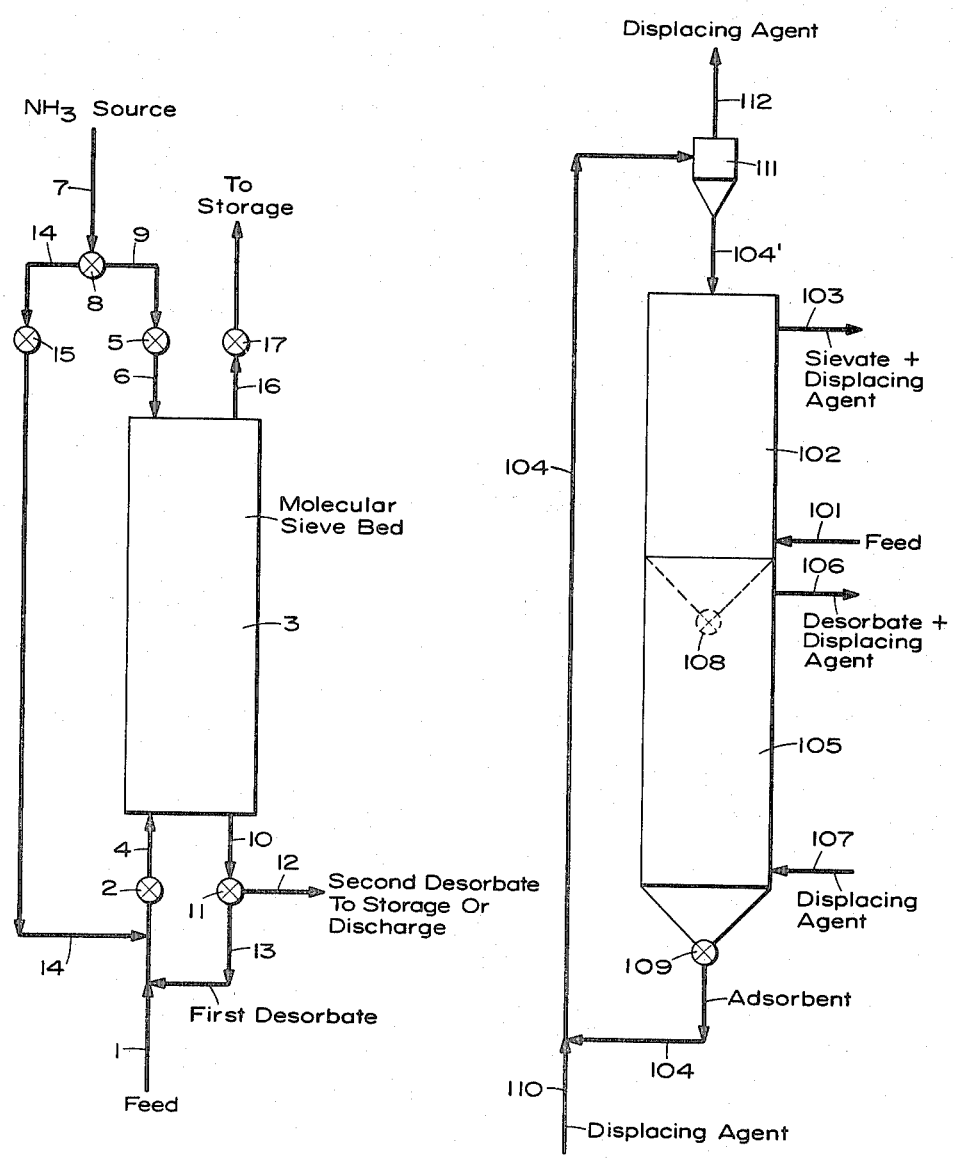

3,242,070
SEPARATION PROCESS
William R. Epperly, New Providence, and Patrick P. McCall, Madison Township, Middlesex County, N.J., assignors to Esso Research and Engineering Company, a corporation of Delaware
Filed June 11, 1964, Ser. No. 374,384
20 Claims. (Cl. 208—310)

This is a continuation-in-part of our earlier filed case, Serial No. 223,078, which was filed on September 12, 1962 for a "Separation Process."

The present invention relates to the separation of cyclic paraffins from mixtures comprising normal paraffins, isoparaffins and cycloparaffins and also to the separation of cyclic olefins from mixtures comprising normal and isoolefins.

There are numerous instances where the separation of cycloparaffins or naphthenes such as normal hexyl cyclohexane and decahydronaphthalene are important in industry. For instance, in the area of manufacture of ultra high luminometer number jet fuels and kerosenes since naphthenes have a low luminometer number relative to the noncyclic paraffins. Another area would be in the recovery of naphthenes for lubes and for high density jet fuel since naphthenes have a high density. A still different area would be in the manufacture of high V.I. lubes by naphthene removal and a further field would be in the recovery of pure normal paraffins. In this case, it is found that normal paraffins from most petroleum sources contain nnaphthenes which can be removed with the present invention. In recovering normal olefins from various refinery streams, it is found that the streams usually contain cyclic olefins. The latter must be removed in order to produce an olefin stream which is satisfactory for the synthesis of biodegradable alkyl benzene sulfonate detergent. If large amounts of cyclic olefins are present, the detergent is not sufficiently biodegradable. In the past, a variety of methods have been utilized to separate these naphthenes. However, they had met with extremely limited success. One method used currently for the manufacture of high luminometer number jet fuel will serve to illustrate this point. This method involves a catalytic dehydrogenation step to convert naphthenes to aromatics followed by solvent extraction to remove the aromatics. This procedure does not actually recover the naphthenes as such although the aromatics recovered could be rehydrogenated to make naphthenes. In addition, the selectivity of the catalytic dehydrogenation step is such that one-ring naphthenes are more readily dehydrogenated than two-ring or three-ring naphthenes. This is undesirable since it is the more condensed naphthenes that contribute most strongly to lowering the luminometer number.

According to this invention, it has been found unexpectedly that naphthenes or cycloparaffins in the presence of normal paraffins and isoparaffins can be selectively adsorbed on zeolitic adsorbents with pore sizes of 6.5 to 15 A. When such a mixture is passed through a bed of zeolitic adsorbent, an adsorption effluent rich in isoparaffins and normal paraffins is collected. The adsorbed phase is, therefore, enriched with naphthenes. In practice, most feeds contain aromatics in addition to the above-named components. In such a case, additional adsorbent is required to adsorb the aromatics as well as the naphthenes. The adsorbent used in this invention is zeolitic in nature. Broadly, adsorbents such as Type X or Type Y sieves, or mordenite are used. More specifically, Type X sieves with monovalent or divalent cations such as those of the alkaline, alkaline earth and transition metal sieves are used. Still more specifically, 10X sieves which contain sodium and calcium cations and 13X sieves which contain sodium cations may be used. This invention is of particular importance, as mentioned previously, in the manufacture of ultra high luminometer jet fuels and kerosenes due to the fact that naphthenes have a low luminometer number relative to noncyclic paraffins.

Luminometer number is a dimensionless term which is used as a measure of flame temperature at a fixed flame radiation in the green-yellow band of the visible spectrum. A luminometer number of a fuel can be correlated with the combustion characteristics of fuels for use in jet engines and the like. It is determined by a technique described in ASTM D-1740. The luminometer number of the jet fuels is important criteria and must be carefully guarded.

It has been found unexpectedly that cycloparaffins or naphthenes in the presence of either normal paraffins and isoparaffins or a combination of both be selectively adsorbed on zeolitic adsorbents with pore sizes of 6.5 to 15 A. When a mixture of cycloparaffins in the presence of linear and nonlinear paraffins is passed through a bed of zeolitic adsorbent, an adsorption effluent rich in isoparaffins and normal paraffins is collected. The adsorbed phase is, therefore, enriched in naphthenes. In practice, most feeds contain aromatics in addition to the above-named components. In such a case, additional adsorbent is required to adsorb the aromatics as well as the naphthenes. Aromatics are more strongly adsorbed than naphthenes of the same boiling points. Therefore, it is necessary to use enough adsorbent to remove most of the aromatics in order to achieve significant naphthene separation.

Most preferably according to this invention, cycloparaffins of $C_9$ and heavier may be removed by selective adsorption on a zeolitic adsorbent from mixture of normal and isoparaffins.

In brief, the preferred embodiment of the process comprises two steps, i.e., adsorption and desorption, which are both carried out preferably in vapor phase in a fixed bed at about atmospheric pressure but preferably slightly above the atmospheric pressure. The process can also be operated in liquid phase. The essential features of this process reside in (a) the unexpected fact that cycloparaffins may be adsorbed from a mixture of normal paraffins and isoparaffins alone or in mixture with one another and cycloolefins in the presence of linear and nonlinear olefins onto a zeolitic adsorbent with pore sizes of 6.5 to 15 A., and (b) the use of certain amounts of feed processed in an adsorption step which results in a significant degree of separation. Desorption can be effected by lowering total pressure, raising temperature, purging with an inert gas, displacement with a gas which is adsorbed, i.e., a displacing agent, or a combination of these. As preferred, but optional facets of the invention, recycle of a portion of the desorbate from each desorbate portion of the cycle to feed and/or the use of a displacing agent in the feed can be employed. The desorbate which will be recycled to feed is referred to herein as "recycle desorbate." The same displacing agent is also used to desorb the adsorbent.

Succinctly stated, the invention concerns a process for separating cycloparaffins from mixtures. The mixtures may contain normal paraffins or isoparaffins as well as both paraffins and isoparaffins simultaneously. The mixtures are contacted with a zeolitic adsorbent in an adsorption zone and the cycloparaffins are selectively adsorbed. The effluent stream passing out of the zone is depleted in cycloparaffins and this is collected. The adsorbed components are desorbed and recovered. These recovered adsorbed components have, as would be expected, an increased content of cycloparaffins relative to the feed prior to said contacting.

The displacing agent is defined as a polar or polarizable material having an appreciable affinity for the zeolitic adsorbent compared with the material desired to be desorbed. The displacing agent will generally have a heat of desorption approximately equal to the material it is desired to desorb. Displacing agents are also referred to as desorbents, displacing agents and desorbing mediums. Suitable displacing agents for the process of this invention include $SO_2$, ammonia, carbon dioxide, $C_1$–$C_5$ alcohols such as methanol and propanol, glycols such as ethylene glycol and propylene glycol, halogenated compounds such as methyl chloride, ethyl chloride, methyl fluoride, nitrated compounds such as nitromethane, and the like. Preferably, the displacing agents are used in a gaseous state. A preferred displacing agent has the general formula:

wherein $R_1$, $R_2$ and $R_3$ are selected from the group consisting of hydrogen and $C_1$–$C_5$ alkyl radicals.

Thus, the desorbing material includes ammonia and the $C_1$–$C_5$ primary, secondary and teritary amines with ammonia being preferred and the $C_1$–$C_5$ primary amines being next in order of preference. Examples of preferred primary amines include ethylamine, methylamine, butylamine and the like.

The adsorbent for use in this invention includes any zeolitic adsorbent having pore sizes of 6.5 to 15 A and, most preferably, 7 to 12 A. Thus, any faujasite-type adsorbent or Type X molecular sieve with monovalent or divalent cations such as Linde 13X or 10X molecular sieve are within the most preferred range. Molecular sieves or zeolites are well-known in the art. See, for instance, U.S. 2,966,451. Also included in the invention are Type Y sieve and mordenite which may be used satisfactorily.

The critical features of this invention pertain to the type of feed utilized and the amount of feed processed per cycle in this process. The feed utilized is as mentioned above, a mixture of normal paraffins, isoparaffins and cycloparaffins or normal olefins, isoolefins and cyclic olefins which heretofore were very difficult to separate. The total amount of feed per cycle processed would be 0.01 to 1.0 w./w., preferably, 0.06 to 0.5. For the especially preferred range, 0.1 to 0.35 would be needed. The amount of feed processed is an important limitation since it directly effects the degree of removal of cycloparaffins from the feed as illustrated by the subsequent examples.

In general, given the feed amounts described elsewhere herein the time for adsorption can be from ⅓ to 1/60 of an hour, preferably ¼ to 1/60 of an hour, and especially preferably ¼ to 5/30 of an hour. The time for desorption can be from ⅓ to 1/60, preferably ¼ to 1/30 and especially preferably, ¼ to 5/30 of an hour. The preferred, but optional, first desorbate which can be used as recycle desorbate, can be characterized in at least two ways, one as a quantity based on adsorbent as 0 to 0.3, preferably 0 to 0.09, and most preferably 0 to 0.07 w./w., and the other as a percent of total desorbate such as 0 to 98, preferably 0 to 90, and most preferably 0 to 80 wt. percent of the total desorbate. Generally, the first desorbate will come off in the first 0.1 to 20, e.g., 0.1 to 10 percent of the time of the total desorption cycle.

The significance of the first desorbate lies in the fact that a relatively large proportion of the desired hydrocarbon, e.g., normal paraffins, product in the adsorption step is adsorbed along with the adsorbate. Upon desorption, both normal paraffins and the cycloparaffins are desorbed from the adsorbent and usually discarded. Although a substantial portion of the desired product, e.g. n-paraffin, can be recovered in this manner, still the separation efficiency is somewhat low. Alternatively, the first portion of desorbate can be collected or discarded.

This optional but preferred feature of the invention makes use of the unexpected finding that at the particular operation conditions described herein, the first portion of the desorbate is primarily normal paraffins and isoparaffins. This portion of the desorbate can be recycled to feed. The remainder of the desorbate is the portion that has the cycloparaffins concentrated therein. Thus, by effecting a first desorbate cut and recycling it to feed, a much greater yield of adsorption effluent and a higher purity cycloparaffin fraction can be realized in the overall process. When desorbate is recycled, the amount of fresh feed processed per cycle is reduced to remain within the previously stated limitations on total feed processed per cycle.

Inert gases or displacing agents can be added to the hydrocarbon feedstream if condensation of feed in the adsorbent binder is a problem. Generally, the addition of such agents to the feed reduces the amount of desorbate collected per cycle. When displacing agents are used, the capacity of the adsorbent for feed components may be reduced to some extent.

FIGURE 1 is a schematic diagram of an apparatus suitable for effecting the process of this invention.

Turning now to FIGURE 1, a 13X sieve bed with means for alternately charging feed to the bed and desorbing the bed is represented as 3. A feed which consists of a kerosene fraction comprising normal paraffins, isoparaffins and cycloparaffins as well as aromatics is fed at 20 p.s.i.a. into line 1 through valve 2. The feed is introduced at a temperature of 500° to 800° F. It passes into line 4 from whence the feed is transferred at a rate of 1.8 w./w./hr. into sieve bed 3. The sievate passes out of the bed through line 16 and valve 17 and from there goes to storage. The sievate is condensed for storage in equipment not shown. After approximately 10 minutes, valves 2 and 16 are closed. Valve 5 is then opened to flow ammonia into bed 3 through line 6. The displacing agent which may be ammonia is obtained from a source which is not shown and flows through line 7 and then into valve 8 from whence it is transported into line 9, passes through valve 5 and finally into line 6 from whence it is introduced into sieve bed 3. The feed rate of ammonia is 1.98 w./w./hr. and the ammonia is flowed into bed 3 under a pressure of 30 p.s.i.a. for about 10 minutes. The desorbate flows out of bed 3 through line 10, valve 11 and into storage through line 12. However, the first 10 to 60 wt. percent desorbate in the desorbate cycle from bed 3 flows through valve 11 and through line 13 and then into feed line 1. Alternatively, it may be condensed and stored for recyle in equipment which is not shown. The remainder of the desorbate of each cycle flows through line 10, valve 11 and through line 12 for discard or, if desired, storage, after being condensed in equipment not shown.

Feed contains ammonia which is supplied partially from line 14 and partially from the ammonia in the first desorbate which is flowed through line 13 to feed line 1. The ammonia in line 14 is supplied from the ammonia source that supplies ammonia for desorption and is flowed through line 7 and into valve 8 and then through valve 15 and line 14 to line 1. Without ammonia in the feed, a much larger desorbate recycle would be required at the preferred adsorption conditions which for this illustration are a temperature range of 600 to 700° F. and 20 up to 30 p.s.i.a. pressure. The ammonia rate in the feed in this illustration was 0.03 w./w./hr.

During the adsorption portion of the cycle, normal and isoparaffins depleted in cycloparaffins only are removed from bed 3 through line 16 and valve 17 for storage. It will be understood that although the specific illustration given above relates to one adsorbent bed, several beds can conveniently be used together. For instance, one bed could be on adsorption while the other bed is on desorption and vice versa. Moreover, it is drawn to a cylcoparaffin feed and an ammonia displacing agent. Other displacing agents or other methods of desorption may be utilized. It should be noted that the method outlined above may also be utilized for the separation of a cyclic olefin from mixtures comprising cyclic, normal and iso-olefins as well as naphthenes from normal paraffins or isoparaffins not in admixture with each other.

The following list summarizes the operating, preferred and especially preferred conditions for the process of the invention when desorption with a displacing agent is used.

|  | Operating | Preferred | Especially Preferred |
|---|---|---|---|
| Adsorption (per Cycle): | | | |
| Temperature, °F | 100 to 800 | 400 to 750 | 550 to 700. |
| Pressure, p.s.i.a | 1 to 100 | 10 to 65 | 15 to 35. |
| Total Average Feed Rate,[4] w./w./hr | 0.2 to 10 | 0.5 to 5 | 1 to 2. |
| Feed/Cycle, w./w | 0.01 to 1.0 | 0.06 to 0.5 | 0.1 to 0.35. |
| Removable Impurities in Feed as Percent of Feed. | 0.0001 to 75 | 0.01 to 50 | 0.08 to 30. |
| Feed | $C_3$ to $C_{60}$ | $C_5$ to $C_{40}$ | $C_{10}$ to $C_{25}$ |
| Displacing Agent[1] in Feed, Wt. of Displacing Agent per Wt. of Feed. | 0 to 10 | 0 to 5 | 0.01 to 0.2. |
| Desorption (per Cycle): | | | |
| Temperature, °F | 400 to 800 | 500 to 750 | 550 to 700. |
| Pressure, p.s.i.a | 1 to 100 | 15 to 65 | 15 to 35. |
| Size of First Desorbate Cut, w./w./cycle. | 0 to 0.3 | 0 to 0.09 | 0 to 0.07. |
| Displacing Agent | N⟨$R_1$,$R_2$,$R_3$⟩ (²) | NH₂-$R_1$ (³) | NH₃. |
| Displacing Agent Rate, w./w./hr | 0.1 to 10 | 1 to 5 | 1 to 4. |
| Displacing Agent, w./w. per Cycle | 0.01 to 5 | 0.02 to 2 | 0.03 to 0.7. |

[1] Same displacing agent as used in desorption.
[2] $R_1$, $R_2$ and $R_3$ are selected from the group consisting of H and $C_1$ to $C_5$ alkyl groups.
[3] $R_1$ is selected from the group consisting of $C_1$ to $C_5$ alkyl groups.
[4] Fresh feed plus recycle.

Other desorption techniques which are well-known in the art can be employed. For example, desorption by raising temperature and purging with a hydrocarbon stream (U.S. 3,063,934) can be used. Also, desorption can be effected by raising temperature only or by raising temperature and lowering pressure (U.S. 3,070,542).

Turning now to FIGURE 2 as illustrated, the instant invention can also be carried out in a similar fashion using a circulating adsorbent system. An example of such a system is a moving bed in which adsorbent drops essentially free flowing through an adsorption and a desorption zone as shown in FIGURE 2. A suitable feedstock would in this case be a mixture of normal paraffins, isoparaffins and cycloparaffins such as in a kerosene fraction which may also contain aromatics. Feed enters adsorption zone 102 through line 101 as a vapor. In this zone, feed is contacted countercurrently with adsorbent which enters zone 102 through line 104. The sievate, which is depleted in cycloparaffins, and the displacing agent pass out of the zone 102 through line 103. The adsorbent passes out through a solids control valve 108 into desorption zone 105 where it is contacted countercurrently with a displacing agent such as ammonia which enters through line 107. The desorbed cycloparaffin, i.e., desorbate, passes out of the unit with any excess ammonia through line 106. The adsorbent passes out of zone 105 through solids control valve 109 into line 104. It is lifted to the top of the unit and similarly the top of zone 102 in a stream of displacing agent such as ammonia which enters line 104 through line 110. At the top of the unit, the ammonia is removed in separator 111 through line 112 and the adsorbent passes into zone 102 through line 104.

The invention is further illustrated by the following examples.

EXAMPLE 1

A mixture containing 96.7% normal paraffins, 0.8% isoparaffins, 1% cycloparaffins and 1.5% aromatics was separated with Linde 13X sieve in an apparatus similar to that described with relation to FIGURE 1. The conditions utilized were as follows:

Table I

|  | Absorption | Desorption |
|---|---|---|
| Temperature, °F | 600 | 610 |
| Pressure, p.s.i.a | 0 | 17 |
| Total Feed Rate, w./w./hr | 1.45 |  |
| Fresh[1] Feed rate, w./w./hr | 1.33 |  |
| NH₃ in Feed, w./w./hr | 0.060 |  |
| NH₃ to Desorb, w./w./hr |  | 3.12 |
| Cycle Time (each step), min | 15 | 15 |
| Adsorption Effluent, w./w./hr | 1.27 |  |

[1] Fresh feed plus desorbate recycle equals total feed.

The adsorption effluent from this bed contained 0.2% cycloparaffins and the aromatics concentration was 0.013 wt. percent thus illustrating the affinity of the sieve bed for the cycloparaffins as opposed to the normal paraffins which were adsorbed to a far lesser extent. The feed was introduced to the bed 3 through line 1, valve 2 and line 4. The effluent was recovered through line 16 and passed through valve 17.

EXAMPLE 2

A jet fuel from South Louisiana crude with the following analyses was also separated:

Paraffins, wt. percent _____ 47.0
1 ring naphthenes, wt. percent _____ 25.0
2 ring naphthenes, wt. percent _____ 10.5
3 ring naphthenes, wt. percent _____ 3.9
Aromatics _____ 13.6

Separation was effected with an apparatus similar to that utilized in FIGURE 1. Linde 13X sieve with a diameter of 1/16 of an inch was placed in vessel 3 and the following conditions were utilized:

Table II

|  | Adsorption | Desorption |
|---|---|---|
| Temperature °, F | 597 | 604 |
| Pressure, p.s.i.g | 5 | 0–5 |
| Fresh Feed Rate, w./w./hr | 1.51 |  |
| Total Feed Rate, w./w./hr | 1.87 |  |
| Total Feed/Cycle, w./w | 0.312 |  |
| NH₃ to Desorb, w./w./hr |  | 1.98 |
| Cycle Time, Min | 10 | 10 |
| Desorbate Recycle to Feed, w./w./hr |  | [1] 0.36 |
| Adsorption Effluent, w./w./hr | 1.27 |  |
| Desorbate (0.5–1 min.) |  | 0.23 |
| Recovery of Feed, percent | 99+ |  |

[1] 0–0.5 min.

The displacing agent used was ammonia. It was introduced for desorption into sieve bed 3 after passing through line 7, valve 8, line 9, valve 5 and line 6. No ammonia was added to the feed. The product obtained in adsorption had the following composition:

Table III

|  | Adsorption Effluent | Component in Adsorption Effluent, lb./Component in Feed, lb. |
|---|---|---|
| Paraffins, wt. percent | 55.4 | 0.987 |
| 1 Ring Naphthenes, wt. percent | 28.6 | 0.960 |
| 2 Ring Naphthenes, wt. percent | 10.8 | 0.863 |
| 3 Ring Naphthenes, wt. percent | 3.5 | 0.754 |
| Aromatics | 1.7 | 0.084 |

Thus, as illustrated by the above Table III, a considerable improvement in naphthenes is obtained by the process of the instant invention. Considering the pounds of each component in the adsorption effluent per pound of that component in the feed, it can be seen that, for example, only 0.754 pound/pound of 3-ring naphthenes pass through the bed when 0.987 pound/pound of the paraffins (normal and isoparaffins) were collected.

The luminometer number of the fuel was increased from 54 to 80 (for adsorption effluent). With removal of aromatics to 1.7% without any naphthene selectivity, the estimated luminometer number is 73.

When the total amount of feed processed per cycle is reduced from 0.312 w./w./cycle (as above) to 0.199 to 0.161 w./w./cycle, more complete naphthene removal is obtained.

| Feed/cycle, w./w. | 0.199 | | 0.161 | |
|---|---|---|---|---|
|  | Adsorption Effluent, Wt. Percent | Component in Adsorption Effluent, lb./Component in Feed, lb. | Adsorption Effluent, Wt. Percent | Component in Adsorption Effluent, lb./Component in Feed, lb. |
| Paraffins | 59.4 | 0.90 | 62.6 | 0.80 |
| 1 Ring Naphthenes | 30.2 | 0.86 | 30.2 | 0.731 |
| 2 Ring Naphthenes | 8.6 | 0.583 | 6.6 | 0.383 |
| 3 Ring Naphthenes | 1.4 | 0.261 | 0.8 | 0.136 |
| Aromatics | 0.4 | 0.019 | 0.2 | 0.008 |

From the above example it is clear that the degree of removal of naphthenes increases as the feed processed per cycle is reduced. This example also shows that the selectivity of the adsorbent for naphthenes increases with the number of rings. With 0.199 w./w./cycle of feed, 0.86 pounds of one-ring naphthenes pass through the bed per pound of feed versus 0.261 for three-ring naphthenes. This shows that three-ring naphthenes are more strongly adsorbed than the less condensed naphthenic compounds. Based on this, one would expect even higher naphthene selectivities for this process when applied to heavier petroleum fractions such as lube oil distillates which contain higher proportions of the three-ring naphthenes plus four-ring and five-ring naphthenic compounds.

EXAMPLE 3

In a process utilizing the same conditions as in Example 2 but differing only in that zone 3 contains Linde 10X sieve as opposed to the 13X sieve contained in the Linde sieve utilized for Example 2. The product shown in Table IV is collected.

Table IV

| | Actual product |
|---|---|
| Paraffins, wt. percent | 55.2 |
| 1 ring naphthenes, wt. percent | 29.1 |
| 2 ring naphthenes, wt. percent | 11.1 |
| 3 ring naphthenes, wt. percent | 3.1 |
| Aromatics | 1.5 |

Table IV indicates that substantially the same results are obtained with 10X sieve as had previously been obtained with 13X sieve.

From the above examples, it is apparent that cyclic paraffins or naphthenes are selectively adsorbed.

Although the invention has been described with some particularity, it will be understood that variations and modifications can be made therein without departing from the spirit of the invention as hereinafter claimed.

What is claimed is:

1. A process of treating a hydrocarbon mixture boiling in the kerosene range or higher, the said mixture comprising normal paraffins, isoparaffins, cycloparaffins and aromatics whereby the cycloparaffins of the mixture are separated which comprises passing 0.01 to 1.0 w./w. per cycle of said mixture over a zeolitic adsorbent, said adsorbent having a pore size of 6.5 to 15 A. whereby cycloparaffinic components of said mixture are selectively adsorbed on said zeolitic adsorbent, collecting an effluent stream which is depleted in cycloparaffins, desorbing the adsorbed components with a gaseous displacing agent and thereby recovering a mixture which is richer in cycloparaffinic components than said original feed.

2. The process of claim 1 wherein said hydrocarbon mixture is a jet fuel.

3. The process of claim 1 wherein said hydrocarbon mixture is a lubricating oil.

4. The process according to claim 1 wherein said displacing agent is

wherein $R_1$, $R_2$ and $R_3$ are selected from the group consisting of $C_1$–$C_5$ alkyl radicals and hydrogen.

5. A process according to claim 1 wherein said cycloparaffin has at least nine carbon atoms.

6. A process according to claim 1 wherein said adsorbent is a type Y sieve.

7. A process according to claim 1 wherein said first portion of the desorbed component is discarded.

8. A process for separating cycloparaffins from kerosenes and higher boiling fractions which contain normal paraffins, isoparaffins and cycloparaffins which comprises contacting said mixture with a zeolitic adsorbent in an adsorption zone, said zeolitic adsorbent having a pore size of 6.5 to 15 A. whereby the cycloparaffins are selectively adsorbed, collecting an effluent stream which is depleted in cycloparaffins, desorbing the adsorbed component and thereby recovering a product having an increased content of cycloparaffins relative to said mixture prior to said contacting.

9. The process of claim 8 wherein said cycloparaffin has at least 9 carbon atoms.

10. The process of claim 8 wherein said cycloparaffin is selected from the group consisting of 2 and 3-ring naphthenes.

11. The process according to claim 8 wherein said adsorbent is a type X sieve with monovalent cations.

12. The process of claim 8 wherein said adsorbent is a type X sieve with divalent cations.

13. A process according to claim 10 wherein said adsorbent is mordenite.

14. The process according to claim 8 wherein desorption is effected with a displacing agent and said displacing agent is

wherein $R_1$, $R_2$ and $R_3$ are selected from the group consisting of $C_1$ to $C_5$ alkyl radicals and hydrogen.

15. The process of claim 8 wherein said fraction is a jet fuel.

16. A process for improving the performance characteristics of a jet fuel, said jet fuel containing cycloparaffins, normal paraffins and isoparaffins in admixture which comprises contacting said jet fuel with a zeolitic adsorbent having pore openings of 6.5 to 15 A. whereby the said cycloparaffins are selectively adsorbed, collecting an effluent stream which is depleted in cycloparaffins, desorbing the adsorbed component by means of a displacing agent, said displacing agent being

wherein $R_1$, $R_2$ and $R_3$ are selected from the group consisting of $C_1$ through $C_5$ alkyl radicals and hydrogen.

17. The process of claim 16 wherein the first 10 to 60 wt. percent of desorbate is recycled back over the said zeolitic adsorbent.

18. The process of claim 16 wherein mordenite is substituted for the zeolitic adsorbent.

19. The process of improving the V.I. of a lube oil fraction, said lube oil containing cycloparaffins, normal paraffins and isoparaffins which comprises contacting said mixture with a zeolitic adsorbent having pore openings of 6.5 to 15 A. in an adsorption zone whereby the said cycloparaffins are selectively adsorbed, collecting an effluent stream which is depleted in cycloparaffins, desorbing the adsorbed components and thereby recovering a product having an increased content of cycloparaffins relative to said mixture prior to said contacting.

20. The process of claim 19 wherein said cycloparaffins have at least 9 carbon atoms.

References Cited by the Examiner

UNITED STATES PATENTS

| | | | |
|---|---|---|---|
| 3,005,768 | 10/1961 | Burke | 208—28 |
| 3,063,934 | 11/1962 | Epperly et al. | 208—310 X |
| 3,070,542 | 12/1962 | Asher et al. | 208—310 |
| 3,083,245 | 3/1963 | Lindahl | 260—676 |
| 3,148,136 | 9/1964 | Woodle | 208—69 |
| 3,161,690 | 12/1964 | Eggertsen | 260—676 X |

FOREIGN PATENTS 851,977  10/1960  Great Britain.

OTHER REFERENCES

Jones: "Advances in Petroleum Chemistry and Refining," vol. 4, 1960, page 121.

ALPHONSO D. SULLIVAN, *Primary Examiner.*